US012687236B2

(12) United States Patent
Carns et al.

(10) Patent No.: US 12,687,236 B2
(45) Date of Patent: Jul. 21, 2026

(54) PROPORTIONAL CONTROL DRIVE MECHANISM

(71) Applicant: Illinois Tool Works Inc., Glenview, IL (US)

(72) Inventors: Christopher A. Carns, Hicksville, OH (US); Joseph D. Davis, Archbold, OH (US); Nathan C. Osmun, Edgerton, OH (US)

(73) Assignee: Illinois Tool Works Inc., Glenview, IL (US)

( * ) Notice: Subject to any disclaimer, the term of this patent is extended or adjusted under 35 U.S.C. 154(b) by 103 days.

(21) Appl. No.: 18/769,840

(22) Filed: Jul. 11, 2024

(65) Prior Publication Data

US 2025/0020232 A1     Jan. 16, 2025

Related U.S. Application Data

(60) Provisional application No. 63/526,037, filed on Jul. 11, 2023.

(51) Int. Cl.
*G05D 23/02* (2006.01)
*F16K 17/38* (2006.01)
*F16K 31/00* (2006.01)

(52) U.S. Cl.
CPC .......... *F16K 31/002* (2013.01); *F16K 17/383* (2013.01); *G05D 23/022* (2013.01)

(58) Field of Classification Search
CPC .... F16K 17/383; F16K 31/002; G05D 23/022
See application file for complete search history.

(56) References Cited

U.S. PATENT DOCUMENTS

2015/0241884 A1* 8/2015 Carns ................... F16K 31/002
                                                              251/248

* cited by examiner

*Primary Examiner* — Jonathan Bradford
(74) *Attorney, Agent, or Firm* — McAndrews, Held & Malloy, Ltd.

(57) ABSTRACT

A thermostatic valve assembly having a valve body with a chamber, an inlet port, a first output port, and a second output port. The thermostatic assembly includes a wax element, a ball valve component with a drive pin, and a plunger with a drive opening to receive the drive pin. The drive opening has a partially flattened oval profile with a first flat section and curved ends, and a second curve connected to the first portion. The plunger is connected to the wax element, slideably secured within the chamber, and moves between a first and second linear position. The ball valve component is rotatably secured within the chamber and moves between a first rotational position when the plunger is in the first linear position and a second rotational position when the plunger is in the second linear position.

20 Claims, 9 Drawing Sheets

| STLC T6 BALLSTAT – AREA/TARGET STROKES | | | | | | |
|---|---|---|---|---|---|---|
| Target Temp (°C) | 85 | 87 | 88.5 | 90 | 91 |
| Sample Temp (°C) | 85.03 | 87.03 | 88.53 | 90.03 | 91.04 |
| Sample Stroke | 0.72 | 1.87 | 3.19 | 5.00 | 6.33 |
| Open Area (mm²) | 0.26 | 11.47 | 88.93 | 244.90 | 371.71 |
| Open Area (%) | 0.03% | 1.34% | 10.4% | 28.64% | 43.46% |

| STLC T6 BALLSTAT – AREA/TARGET STROKES | | | | | | |
|---|---|---|---|---|---|---|
| Target Temp (°C) | 85 | 87 | 88.5 | 90 | 91 |
| Sample Temp (°C) | 85.03 | 87.03 | 88.53 | 90.03 | 91.04 |
| Sample Stroke | 0.72 | 1.87 | 3.19 | 5.00 | 6.33 |
| Open Area (mm²) | 0.00 | 4.39 | 33.44 | 171.21 | 295.83 |
| Open Area (%) | 0.00% | 0.51% | 3.91% | 20.02% | 34.59% |

PROPORTIONAL CONTROL DRIVE MECHANISM

CROSS-REFERENCE

The present application claims priority to U.S. Provisional Patent Application No. 63/526,037, filed Jul. 11, 2023, and entitled "Proportional Control Drive Mechanism" which is hereby incorporated by reference in its entirety.

BACKGROUND

This disclosure relates to a thermostatic valve assembly, which is used to control the flow of fluids such as water, oil, or coolant in response to temperature changes. Thermostatic valves are used in various applications to control fluid flow based on temperature changes. One type of thermostatic valve uses a wax element that expands or contracts in response to temperature changes to control fluid flow.

Thermostatic valves and ball valve components can be used in various applications to regulate fluid flow. Traditional systems often require manual intervention or complex electronic controls to respond to temperature changes. In one example, internal combustion engines typically include a cooling circuit configured to allow coolant, such as antifreeze or water, to flow through a radiator.

The present disclosure seeks to provide an efficient, automatic solution by integrating a thermostatic wax element with a ball valve component mechanism.

SUMMARY

The present disclosure relates generally to an improved thermostatic valve assembly with improved characteristics, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 2b illustrates a first isometric view of the valve assembly.

FIG. 2c illustrates a first isometric cross-sectional view of the valve assembly, taken along cutline A-A in FIG. 2a.

FIG. 2e illustrates a second isometric cross-sectional view of the valve assembly, taken along cutline B-B in FIG. 2a.

Figures 3A, 3B:
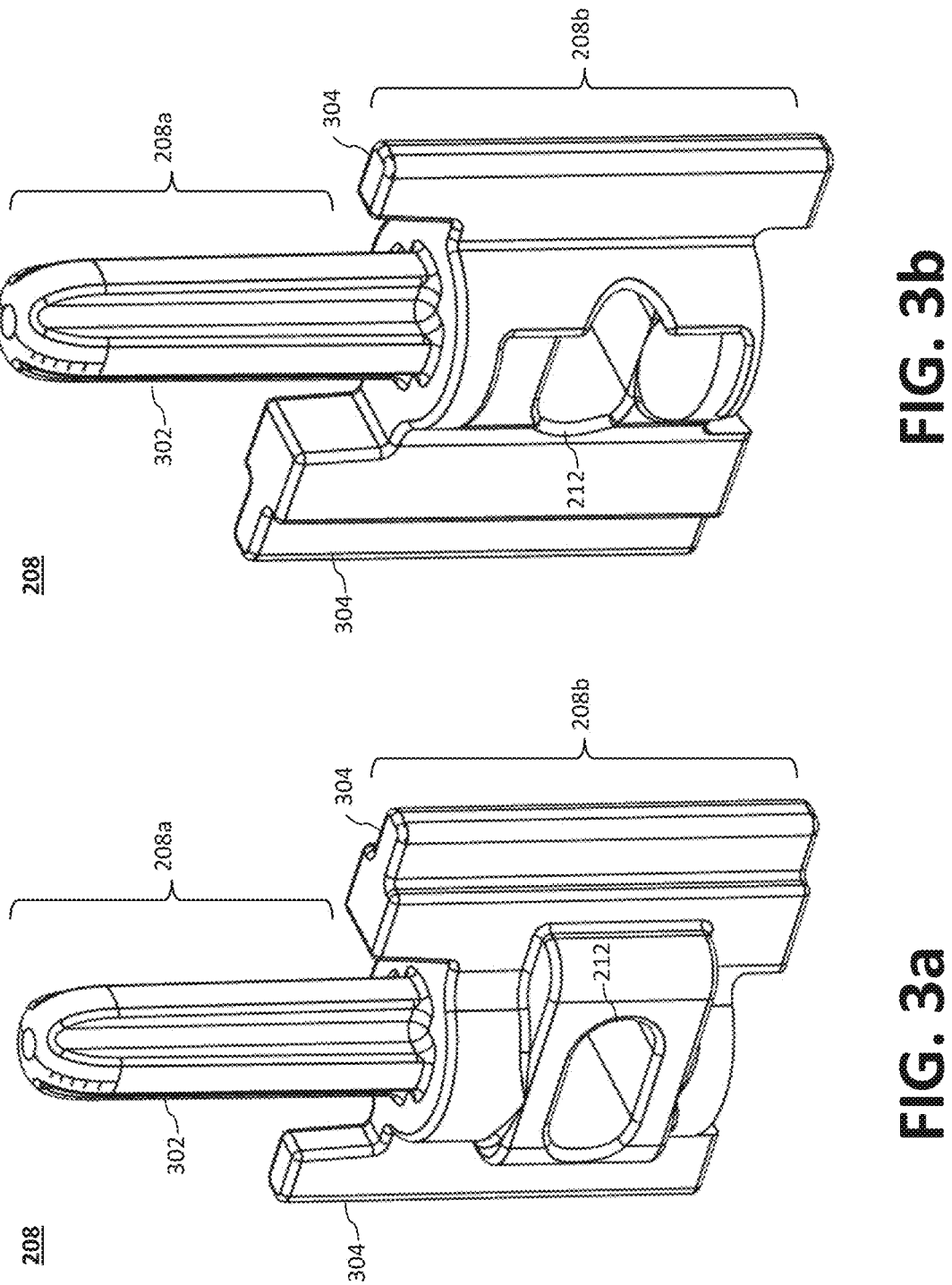

FIGS. 3a and 3b respectively illustrate first and second side elevation views of a plunger within the thermostatic assembly in accordance with aspects of this disclosure.

Figures 3C, 3D, 3E, 3F:
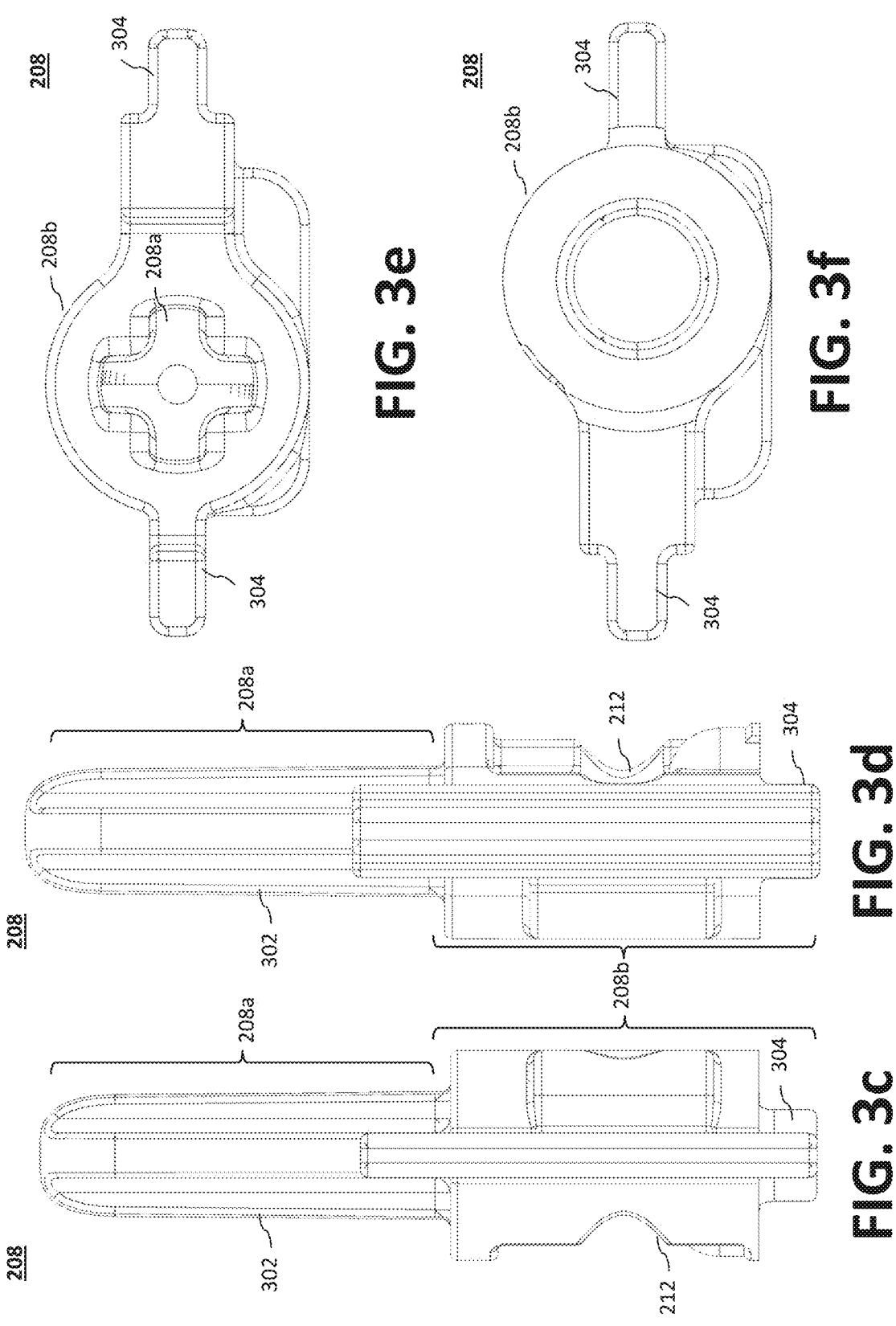

FIGS. 3c and 3d respectively illustrate first and second side elevation views of the plunger.

FIGS. 3e and 3f respectively illustrate top and bottom plan views of the plunger.

Figures 3G, 3H:
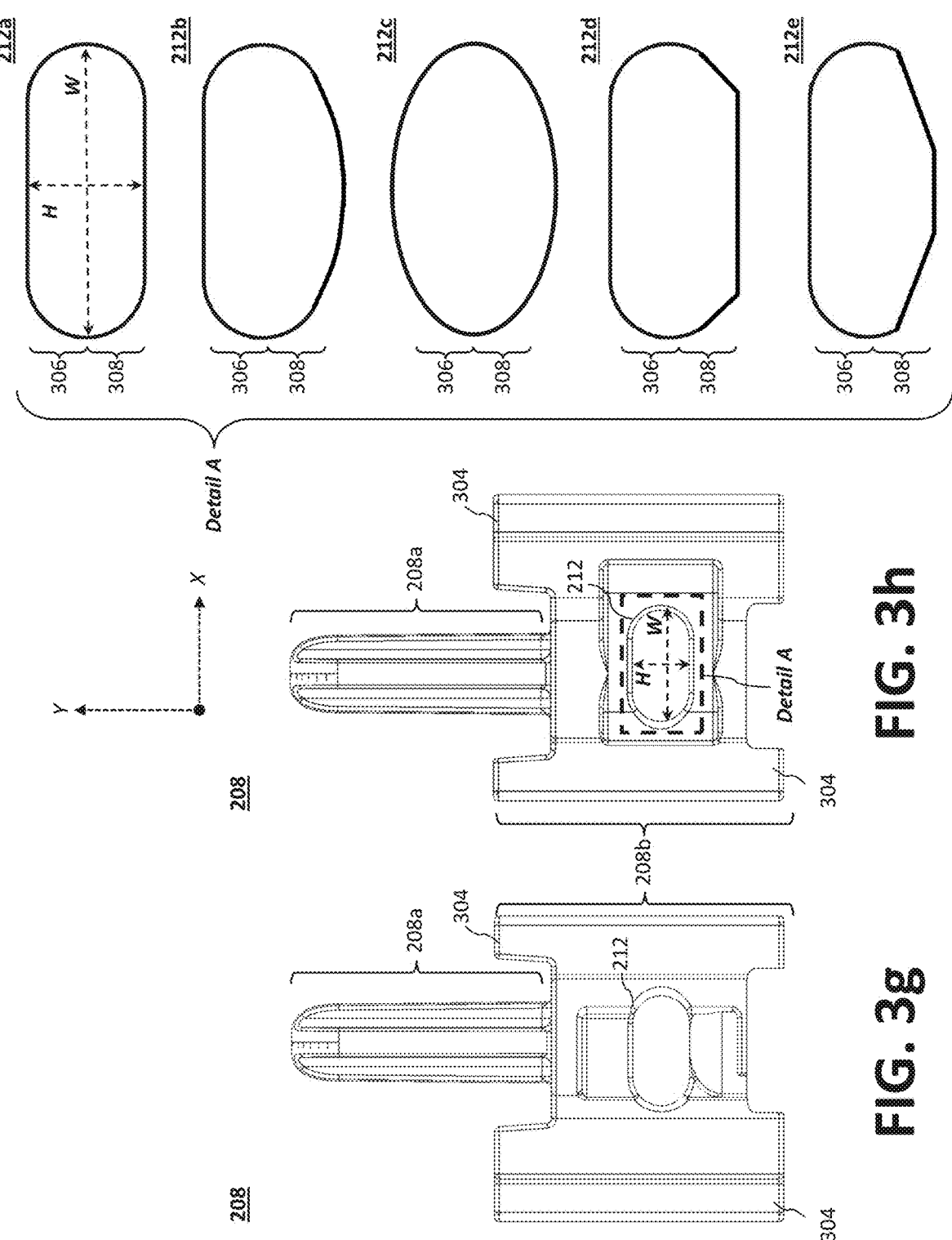

FIGS. 3g and 3h respectively illustrate third and fourth side elevation views of the plunger.

FIGS. 4a and 4b respectively illustrate testing data for a plunger with a flattened oval plunger opening and a plunger with an oval-shaped opening that has one flat side.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

Advantages of thermostatic wax valve actuators include reliability, precision, and self-contained operation. With few moving parts and a robust design, thermostatic wax valve actuators offer high reliability and a long service life. The ability of thermostatic wax valve actuators to provide precise temperature control stems from the known expansion properties of a given wax. Moreover, thermostatic wax valve actuators do not require an external power source, operating instead based on temperature changes, which simplifies their integration into various systems. However, there are some limitations to existing thermostatic wax valve actuators, such as their slower response times compared to electronic actuators and the operational temperature range is restricted to the melting and solidifying points of the wax used in the element.

Disclosed is a thermostatic valve assembly for an internal combustion engine cooling system. A thermostatic wax valve actuator is configured to regulate the flow of fluids, such as coolant in an engine, by responding to temperature variations. The actuator comprises several primary components, including a wax element, a plunger, housing, and a return spring.

The present disclosure relates to thermostatic wax valves and, more specifically, to a thermostatic wax valve assembly comprising a ball valve component that rotates in response to linear movement of a plunger, which is driven by changes in wax volume due to temperature variations.

In one example, a thermostatic valve assembly comprises: a valve body having a chamber, an inlet port, a first output port, and a second output port; and a thermostatic assembly comprising a wax element, a ball valve component having a drive pin, and a plunger having a drive opening that is configured to receive the drive pin, wherein the drive opening defines a partially flattened oval profile with an upper portion that defines a flat section with a curved turn at each end and a lower portion that defines a curve that is connected at each of its ends to the upper portion, wherein the plunger is connected to the wax element and slideably secured within the chamber and configured to move between a first linear position and a second linear position, and wherein the ball valve component is rotatably secured within the chamber and configured to move between a first rotational position when the plunger is in the first linear position and a second rotational position when the plunger is in the second linear position.

In another example, a thermostatic assembly for use in a thermostatic valve assembly having a chamber comprises: a wax element; a ball valve component having a drive pin; and a plunger having a drive opening that is configured to receive the drive pin, wherein the drive opening defines a partially flattened oval profile with an upper portion that defines a flat section with a curved turn at each end and a lower portion that defines a curve that is connected at each of its ends to the upper portion, wherein the plunger is connected to the wax element and slideably secured within the chamber and configured to move between a first linear position and a second linear position, and wherein the ball valve component is rotatably secured within the chamber and configured to move between a first rotational position when the plunger is in the first linear position and a second rotational position when the plunger is in the second linear position.

In yet another examples, a plunger for use in a thermostatic assembly having a wax element and a ball valve component having a drive pin comprises: a neck portion; and a body portion that defines a drive opening configured to receive the drive pin, wherein the drive opening defines a partially flattened oval profile with an upper portion that defines a flat section with a curved turn at each end and a lower portion that defines a curve that is connected at each of its ends to the upper portion, wherein the plunger is connected to the wax element and slideably secured and configured to move between a first linear position and a second linear position, and wherein the plunger is configured to move the ball valve component between a first rotational position when the plunger is in the first linear position and a second rotational position when the plunger is in the second linear position.

In some examples, the curve of the lower portion is a half-oval.

In some examples, the curve of the lower portion is a half-circle.

In some examples, the partially flattened oval profile is symmetrical across its vertical axis.

In some examples, the plunger is configured to move between a first linear position and a second linear position in a direction that is parallel to the vertical axis.

In some examples, the drive pin has a circular cross-section.

Figure 1:
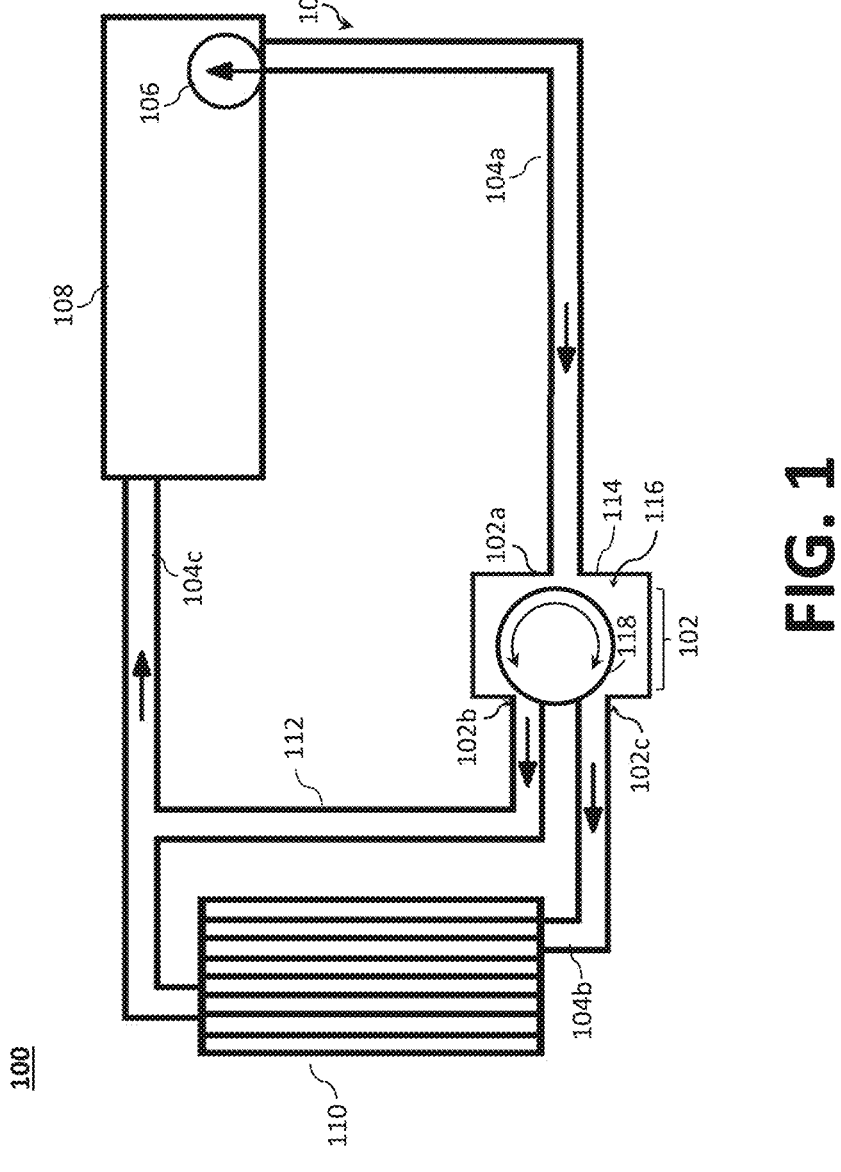
FIG. 1 illustrates a schematic diagram of an example internal combustion engine cooling system according to aspects of this disclosure.

FIG. 1a illustrates a schematic diagram of an internal combustion engine cooling system 100. As shown, the internal combustion engine cooling system 100 includes a cooling circuit 104 operatively connected to a coolant pump 106 of the internal combustion engine 108. The coolant pump 106 can be, for example, a water pump or an anti-freeze pump. The cooling circuit 104 includes a radiator 110, a thermostatic valve assembly 102, and one or more fluid conduits.

The thermostatic valve assembly 102 is configured to interrupt and/or direct the flow of coolant through the cooling circuit 104 based on, for example, the operational status of the internal combustion engine 108 or system (e.g., a temperature thereof). As will be described in connection with FIGS. 2a through 2g, the thermostatic valve assembly 102 can be a thermostatic wax valve ball valve component assembly that integrates a wax element, a plunger, and a ball valve component into a cohesive unit, allowing for efficient and automatic control of fluid flow based on temperature variations.

As illustrated, the internal combustion engine 108 is in fluid communication with the radiator 110 and the thermostatic valve assembly 102 via the one or more fluid conduits. The fluid conduits include, for example, a bypass conduit 112 to convey coolant from the thermostatic valve assembly 102 to the internal combustion engine 108 (bypassing the radiator 110), a first conduit 104a to convey coolant from the internal combustion engine 108 to the thermostatic valve assembly 102, a second conduit 104b to convey coolant from the thermostatic valve assembly 102 to the radiator 110, and a third conduit 104c to convey coolant to the internal combustion engine 108 from either the radiator 110 or the bypass conduit 112 (depending on the position of the thermostatic valve assembly 102). The cooling circuit 104 may be effectively shunted by the bypass conduit 112. For example, the cooling circuit 104 may be effectively shunted by the bypass conduit 112 when the engine is cold (e.g., at a low temperature).

Figure 2A:
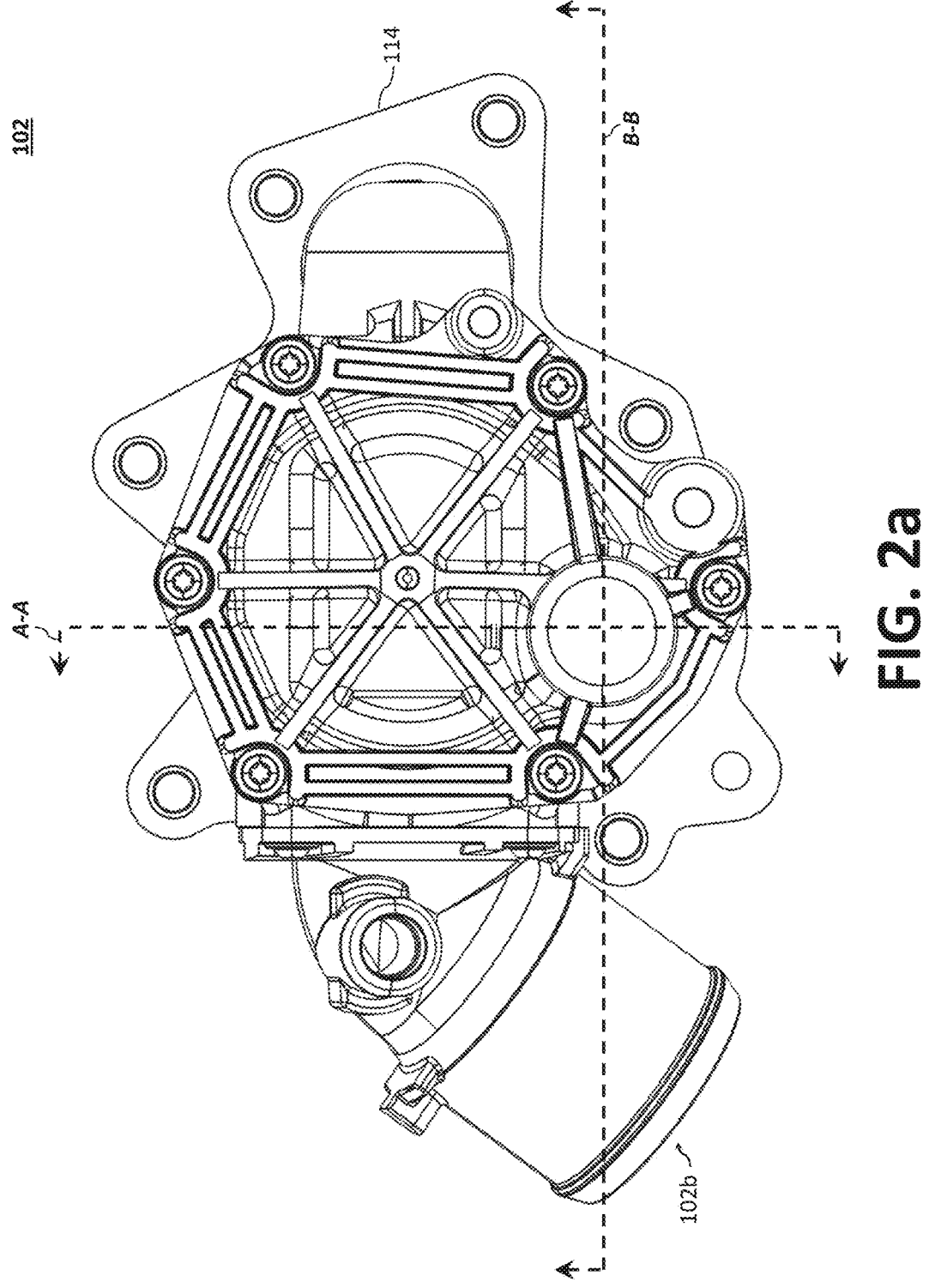
FIG. 2a illustrates a top plan view of the valve assembly in accordance with aspects of this disclosure.
Figures 2B, 2C:
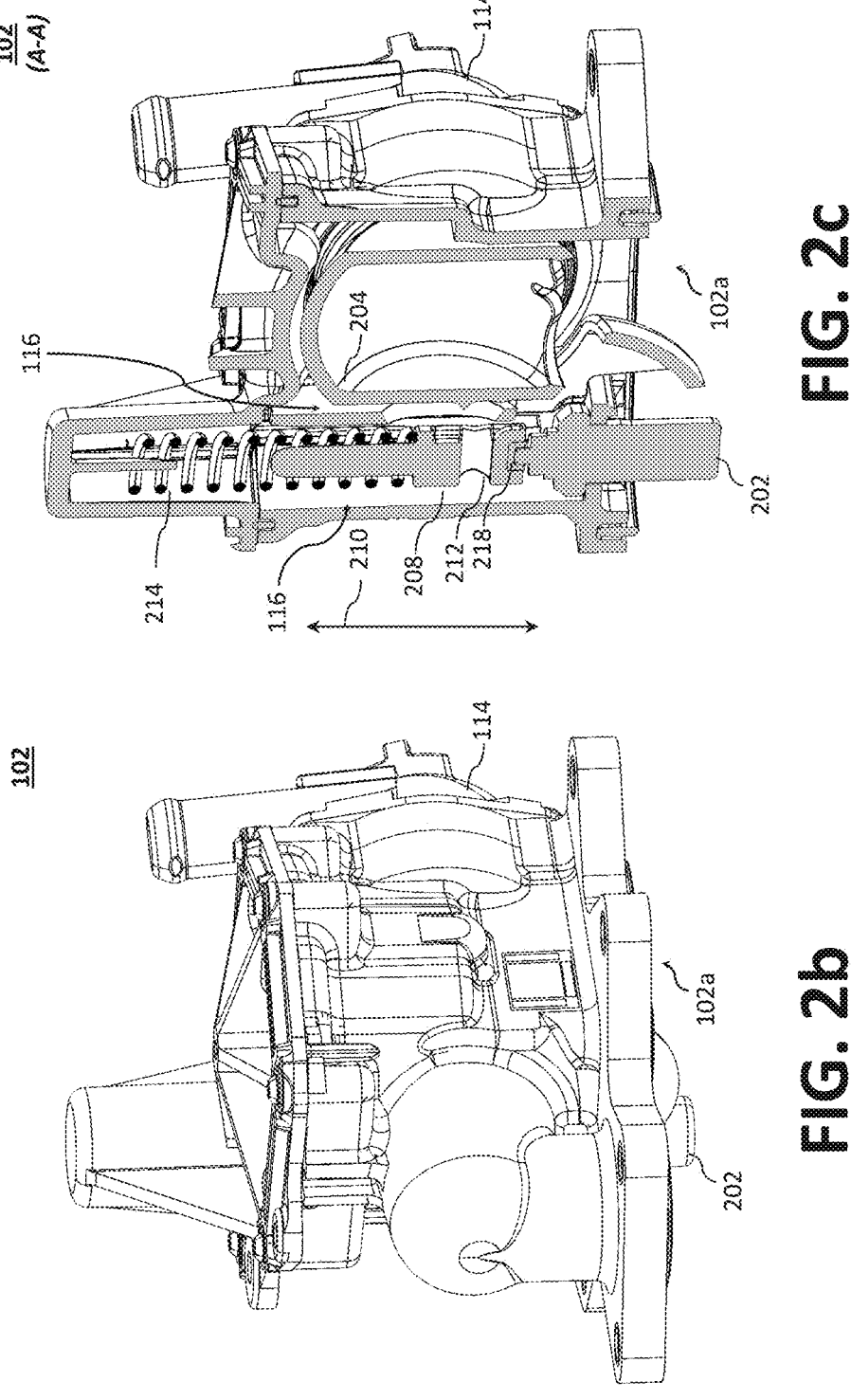
Figure 2D:
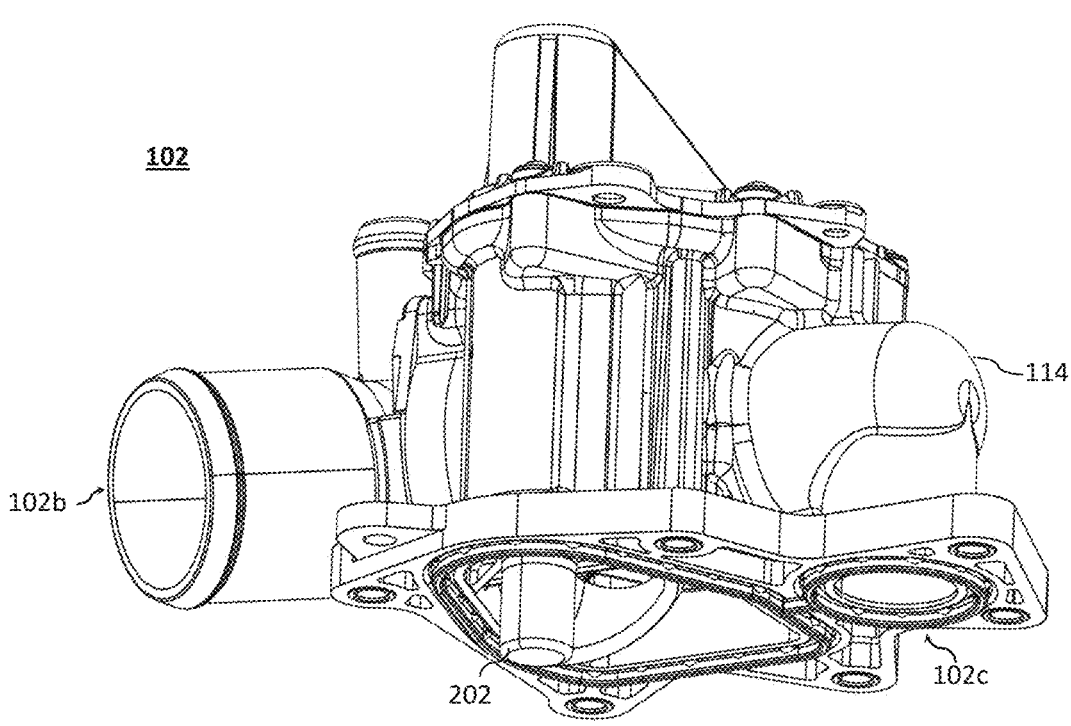
FIG. 2d illustrates a second isometric view of the valve assembly.
Figure 2E:
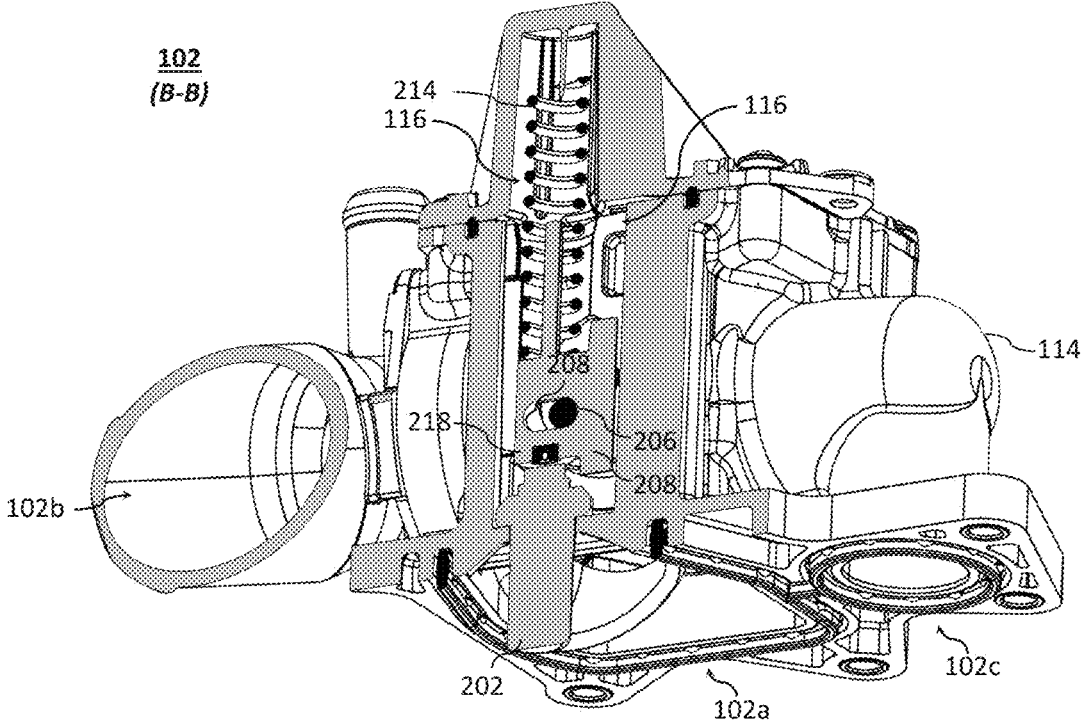
Figures 2F, 2G:
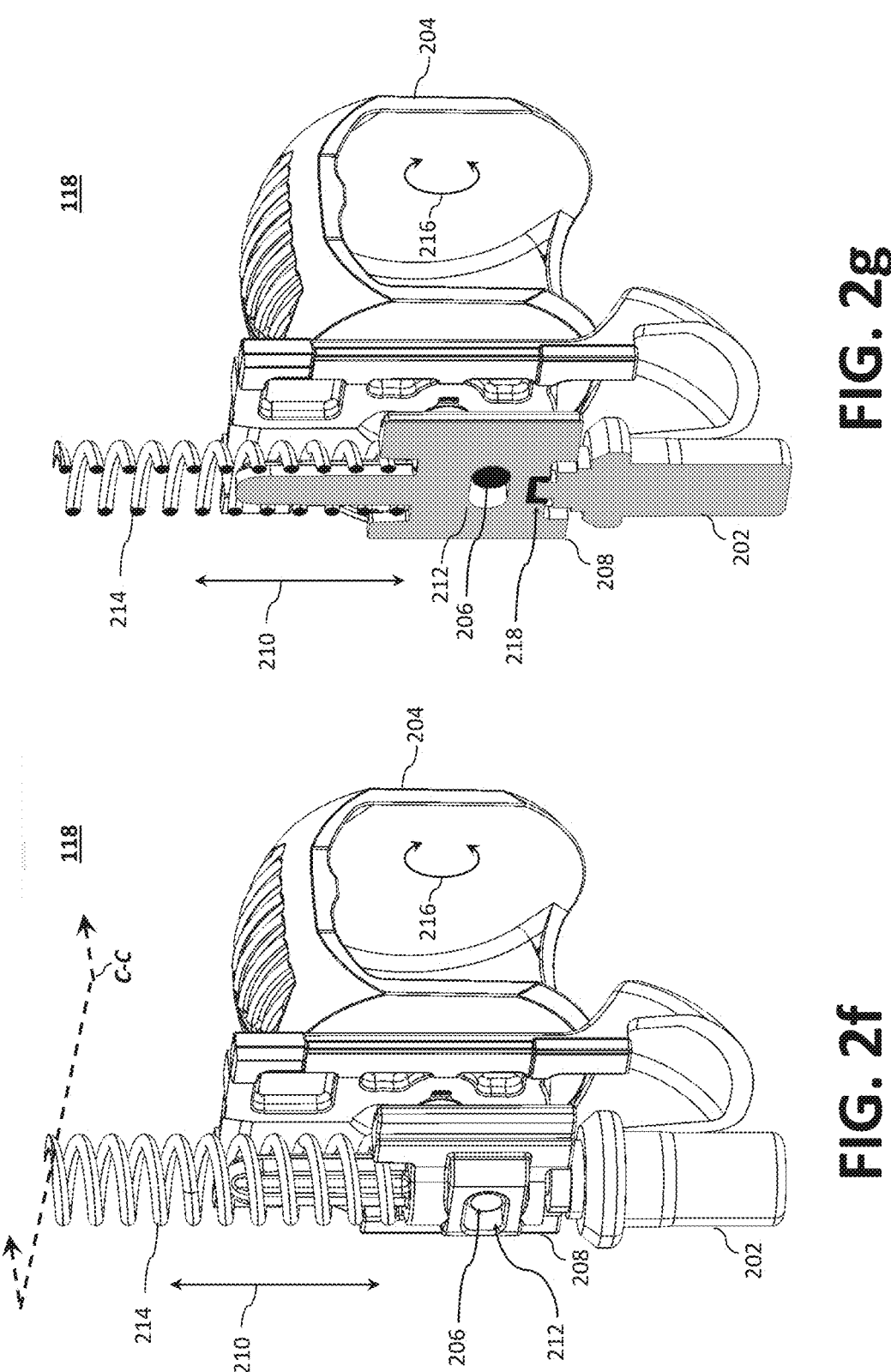
FIG. 2f illustrates an isometric view of a thermostatic assembly within the valve assembly.
FIG. 2g illustrates an isometric cross-sectional view of the thermostatic assembly, taken along cutline C-C in FIG. 2f.

FIG. 2a illustrates a top plan view of the thermostatic valve assembly 102 in accordance with aspects of this disclosure. FIG. 2b illustrates a first isometric view of the thermostatic valve assembly 102, while FIG. 2c illustrates a first isometric cross-sectional view of the thermostatic valve assembly 102, taken along cutline A-A in FIG. 2a. FIG. 2d illustrates a second isometric view of the thermostatic valve assembly 102, while FIG. 2e illustrates a second isometric cross-sectional view of the thermostatic valve assembly 102, taken along cutline B-B in FIG. 2a. FIG. 2f illustrates an isometric view of a thermostatic assembly 118 within the thermostatic valve assembly 102, while FIG. 2g illustrates an isometric cross-sectional view of the thermostatic assembly 118, taken along cutline C-C in FIG. 2f.

The thermostatic valve assembly 102 includes a valve body 114 defining a chamber 116, an inlet port 102a configured to couple fluidically with the first conduit 104*a*, a radiator output port 102*c* configured to couple fluidically with the second conduit 104*b*, and a bypass output port 102*b* configured to couple fluidically with the bypass conduit 112. The valve body 114 encloses the ball valve component 204, drive pin 206, plunger 208, and wax element 202. It includes fluid inlet and outlet ports aligned with the ball valve component 204 passageways such that the ball valve component 204 can direct, redirect, or shut off fluid flow between and/or the fluid inlet and outlet ports. The fluid inlet and outlet ports include the inlet port 102*a*, the bypass output port 102*b*, and the radiator output port 102*c*.

The thermostatic valve assembly 102 includes multiple elements that form the thermostatic assembly 118 to redirect fluid flow between the inlet port 102*a*, the bypass output port 102*b*, and the radiator output port 102*c*. The thermostatic assembly 118 comprises a plunger 208, a wax element 202, and a ball valve component 204. Accordingly, the thermostatic valve assembly 102 includes one or more fixed elements (e.g., the wax element 202) and moving elements (e.g., the ball valve component 204 and the plunger 208).

The plunger 208 is configured to translate linearly, as indicated by arrow 210. The plunger 208 is operatively coupled to the ball valve component 204 via the drive pin 206 and the drive opening 212, such that the ball valve component 204 rotates about an axis (in the directions indicated by arrow 216) in response to the linear movement of the plunger 208. The plunger 208 is connected to the wax element 202, which is actuated by the expansion and contraction of the wax. A return spring 214 can be used to assist in returning the plunger 208 to its original position as the wax cools and contracts. The plunger 208 converts the linear motion resulting from the wax expansion and contraction into the rotational motion required to operate (i.e., rotate) the ball valve component 204. The thermostatic valve assembly 102 ensures precise control of the ball valve component 204 position in response to temperature changes.

The ball valve component 204 is configured to rotate within the valve body 114, as indicated by arrow 216. The ball valve component 204 comprises a drive pin 206 extending from its exterior surface, and the plunger 208 defines a drive opening 212 configured to receive at least a portion of the drive pin 206. The ball valve component 204 is a spherical component with one or more passageways that align with the fluid flow paths of the valve body 114 when in the open position. It rotates to control the flow of fluid through the valve body 114. The ball valve component 204 can be rotated to align the fluid flow paths, thereby opening the thermostatic valve assembly 102, or to position the passageway perpendicular to the flow path, thereby closing the thermostatic valve assembly 102. The drive pin 206 is a rigid component connected to the ball valve component 204 and extends outwardly to engage with the plunger 208.

The wax element 202, which can be enclosed in a housing, is configured to expand and contract in response to temperature changes. The wax element 202 contains a specific type of wax with a high coefficient of thermal expansion, meaning it expands significantly when heated and contracts upon cooling. This wax is encased in a housing designed to permit fluid flow. The expansion and contraction of the wax element 202 drives the plunger 208.

When the surrounding temperature rises, the wax inside the element melts and expands. This expansion exerts pressure on the plunger 208, causing it to move outward. The linear movement of the plunger 208 then actuates the valve, typically opening it to allow coolant or other fluids to flow through a radiator 110 (or other heat exchanger). This flow of fluid helps regulate and dissipate heat, maintaining the system at an optimal temperature. Conversely, when the temperature decreases, the wax solidifies and contracts. The return spring 214 assists in pulling the plunger 208 back to its original position, thereby closing the valve or reversing its operation, depending on the system design.

In the illustrated example, the plunger 208 is configured to move (e.g., slide) between a first linear position and a second linear position within the chamber 116 via a wax element 202 to move the ball valve component 204 between a first rotational position and a second rotational position within the chamber 116 to redirect fluid flow. In some examples, the wax element 202 engages the plunger 208 via a cap or spacer 218.

In the first linear position, the thermostatic valve assembly 102 moves the ball valve component 204 to the first rotational position to fluidly couple the first conduit 104*a* to the second conduit 104*b*. In the second linear position (i.e., bypass position), the thermostatic valve assembly 102 moves the ball valve component 204 to a second rotational position to fluidly couple the first conduit 104*a* to the bypass conduit 112. When the plunger 208 is in the first linear position, coolant that is cooled by the radiator is provided to the internal combustion engine 108, while warm coolant (i.e., coolant that has not been run through the radiator 110) is provided to the internal combustion engine 108 when the plunger 208 is in the second linear position. The plunger 208 is operably coupled to the wax element 202, which moves the plunger 208 between the first linear position and the second linear position.

Initially, the coolant circulates through the bypass conduit 112 so the internal combustion engine 108 reaches operational temperature more quickly. The flow opening to the bypass conduit 112 can then be blocked by the thermostatic valve assembly 102 after the coolant reaches a predefined temperature (e.g., associated with the melting point of the wax). The second conduit 104*b* to the radiator 110 can then be opened to allow for cold coolant to flow from the radiator 110 into the third conduit 104*c* as necessary to regulate temperature.

When the wax element 202 expands due to an increase in temperature, the plunger 208 moves upward, causing the drive pin 206 to rotate the ball valve component 204 in a first direction. More specifically, as the temperature increases, the wax element 202 expands, pushing the plunger 208 upward in a first linear direction. The drive pin 206, received in the elongated drive opening 212 of the plunger 208, is urged upward by the curved side of the drive opening 212. This upward movement of the drive pin 206 causes the ball valve component 204 to rotate in a first rotational direction, aligning the passageway with the fluid flow path to allow fluid to pass through.

Conversely, when the wax element 202 contracts as the temperature decreases, the plunger 208 moves downward, causing the drive pin 206 to rotate the ball valve component 204 in the opposite direction, returning it to its original position. This bidirectional movement allows for accurate control of the valve. More specifically, as the temperature decreases, the wax element 202 contracts, allowing the plunger 208 to move downward in a second linear direction, which can be with the assistance of the return spring 214. The drive pin 206, received in the drive opening 212 of the plunger 208, is urged downward by the drive opening 212. This downward movement of the drive pin 206 causes the ball valve component 204 to rotate in a second rotational direction, returning the passageway to its original position and stopping the fluid flow.

While the thermostatic valve assembly 102 is described in connection with an internal combustion engine cooling system 100, the thermostatic valve assembly 102 can be used in other applications where it is desired to control or direct fluid flow. For example, the thermostatic valve assembly 102 can be used in various applications and in connection with other structures, such as engine cooling systems, transmission cooling systems, heating systems, and industrial fluid control processes.

The interaction between the plunger 208 and the drive pin 206 allows for precise rotational control of the ball valve component 204 in response to linear movement, ensuring accurate regulation of fluid flow. The disclosed interaction minimizes wear and tear, enhancing the durability and reliability of the valve assembly. The use of a wax element 202 ensures rapid and responsive adjustments to temperature changes, maintaining optimal fluid flow conditions.

To that end, the plunger 208 can employ one of a plurality of different profiles for the drive opening 212 to receive the drive pin 206, such that linear movement of the plunger 208 causes rotational movement of the ball valve component 204. This design ensures precise control of fluid flow in response to temperature changes. 212*a*

FIGS. 3*a* through 3*h* illustrated detailed views of the plunger 208. FIGS. 3*a* and 3*b* respectively show first and second side elevation views of a plunger 208 within the thermostatic assembly 118 in accordance with aspects of this disclosure. FIGS. 3*c* and 3*d* respectively illustrate first and second side elevation views of the plunger 208. FIGS. 3*e* and 3*f* respectively present top and bottom plan views of the plunger 208. FIGS. 3*g* and 3*h* respectively show third and fourth side elevation views of the plunger 208.

As illustrated, the plunger 208 generally comprises a neck portion 208*a* and a body portion 208*b*. The neck portion 208*a* and the body portion 208*b* can be a unitary structure, as illustrated. The neck portion 208*a* is configured to receive the return spring 214, while the body portion 208*b* defines the drive opening 212. In the illustrated example, the return spring 214 is slipped over and around the neck portion 208*a* and generally retained in place via one or more ribs or spaces 302 that span the long length of the neck portion. In some examples, the body portion 208*b* can further include one or more side rails 304 (illustrated with two) that are designed to slip into one or more corresponding slots or recesses formed in the valve body 114. The side rails 304 cooperate with the corresponding slots or recesses to maintain alignment during the linear movement of the plunger 208 relative to the valve body 114.

The drive opening 212 defines a generally oblong or elongated slot-like cross-sectional shape, with a width (W, along the X-axis) that is greater than its height (H, along the Y-axis). This elongated shape allows the drive pin 206 to translate laterally (along the Y-axis) within the drive opening 212 during operation (i.e., as the plunger 208 is activated to move linearly along the Y-axis. In other words, the width of the drive opening 212 is substantially perpendicular to the axis along which the plunger 208 is configured to translate linearly (i.e., the Y-Axis or arrow 210). The drive opening 212 can be configured in multiple profile shapes, examples of which are illustrated in Detail A of FIG. 3*h*, each tailored to specific applications and design requirements.

The first profile variation, the flattened oval profile 212*a*, is symmetrical across both the X-axis and Y-axis. Its upper portion and lower portion 308 are linear and parallel to the X-axis, while the ends (left and right sides) are half-circles, resulting in a flattened oval shape. The partially flattened oval profile 212*b* is symmetrical across the Y-axis, but asymmetrical across the X-axis, featuring an upper portion 306 that includes a flat section with 90-degree radius turns at each end (half of a flattened oval), and a lower portion 308 shaped like a half-oval. While a half-oval is illustrated, it is also contemplated that the lower portion 308 can be a half-circle. In this example, the drive opening 212 defines a partially flattened oval profile 212*b* where the upper portion 306 defines a flat section with a 90-degree radius turn at each end and a lower portion 308 defines a curve that is connected at each end to the upper portion 306. For example, the curve of the lower portion 308 can extend continuously between its ends.

The oval profile 212*c* is symmetrical across both the X-axis (horizontal axis) and Y-axis (vertical axis), entirely oval in shape, providing a smooth, continuous curve around the entire perimeter. The wide trapezoidal flattened oval profile 212*d* is symmetrical across the Y-axis but asymmetrical across the X-axis. Its upper portion 306 is similar to a flattened oval with a flat section and a curved turn (e.g., a 90-degree radius turn) at each end, while the lower portion 308 forms a trapezoid with a linear base that spans 70-80% of the width of the drive opening 212, providing a wider base for support. Lastly, the narrow trapezoidal flattened oval profile 212*e* is also symmetrical across the Y-axis but asymmetrical across the X-axis. It has an upper portion 306 that mirrors the flattened oval structure with 90-degree radius turns at each end, and a lower portion 308 that is a narrower trapezoid with a linear base spanning 30-40% of the width of the drive opening 212, offering a more compact base.

The drive opening 212 is symmetrical across the Y-axis in all configurations, ensuring consistent interaction with the drive pin 206 regardless of vertical orientation. However, asymmetry across the X-axis is present in all profiles except the flattened oval profile 212*a* and the oval profile 212*c*, which are symmetrical on both axes. In the illustrated example, the drive pin 206 has a circular cross-section. Each profile shape of the drive opening 212 is designed to accommodate specific functional requirements, offering varying degrees of stability, support, and flexibility for the drive pin 206. This range of profile shapes allows for customization based on the intended application of the plunger 208, ensuring optimal performance and compatibility with different mechanical systems. Overall, the plunger 208, with its drive opening 212, provides a robust solution for mechanical interfacing with the drive pin 206, making it suitable for a wide array of applications where secure and efficient mechanical connections are essential.

FIGS. 4*a* and 4*b* respectively provide testing data for a plunger 208 having, respectively, a drive opening 212 with a flattened oval profile 212*a* and a partially flattened oval profile 212*b* (e.g., a flattened oval profile with only one flat side at the upper portion 306). Changing the profile shape of the drive opening 212 from a flattened oval profile 212*a* to a partially flattened oval profile 212*b* brings certain improvements. First, adjusting the shape of the drive opening 212 allows the drive pin 206 to move correctly to rotate the ball valve component 204 when the plunger 208 is activated (i.e., moves linearly) by the wax element 202. With a flat slot, there is a risk of the drive pin 206 moving in the wrong direction, thus rotating the ball valve component 204 incorrectly.

Notably, this change provides a longer dwell at lower flow rates in the valve design, more closely meeting desired flow rates at various temperatures. While the flattened oval drive opening 212*a* has limitations, the partially flattened oval profile 212*b* offers the necessary flexibility. This shape of the drive opening 212 allows the plunger 208 to ensure proper dwell during the rotation of the ball valve components 204, optimizing coolant flow metering to achieve the desired flow curve. Different systems may require varying coolant flow curves for specific modes, such as engine heat-up. The drive opening 212 in the plunger 208 enables the precise flow rate needed to meet these requirements through the interface between the eccentric drive pin 206 on the ball valve component 204 and the plunger 208.

Referring to the open area values shown in FIGS. 4a and 4b and highlighted by dotted first and second bounding boxes 402 and 404, the partially flattened oval profile 212b allows for increased flexibility. This flexibility enables the ball valve component 204 to remain in a metering state longer, dosing coolant to the internal combustion engine cooling system 100 more slowly. Consequently, this allows for faster heating of the internal combustion engine 108 and transmissions to which the thermostatic valve assembly 102 is attached.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A thermostatic valve assembly comprising:
a valve body having a chamber; and
a thermostatic assembly comprising a wax element, a ball valve component having a drive pin, and a plunger having a drive opening that is configured to receive the drive pin,
wherein the drive opening defines a partially flattened oval profile with a first portion that defines a flat section with a curved turn at each end and a second portion that defines a curve that is connected at each of its ends to the first portion,
wherein the plunger is connected to the wax element and slideably secured within the chamber and configured to move between a first linear position and a second linear position, and
wherein the ball valve component is rotatably secured within the chamber and configured to move between a first rotational position when the plunger is in the first linear position and a second rotational position when the plunger is in the second linear position.

2. The thermostatic valve assembly of claim 1, wherein the curve of the second portion is a half-oval.

3. The thermostatic valve assembly of claim 1, wherein the curve of the second portion is a half-circle.

4. The thermostatic valve assembly of claim 1, wherein the partially flattened oval profile is symmetrical across an axis substantially parallel to the plunger.

5. The thermostatic valve assembly of claim 4, wherein the plunger is configured to move between the first linear position and the second linear position in a direction that is parallel to the vertical axis.

6. The thermostatic valve assembly of claim 5, wherein the drive pin has a circular cross-section.

7. The thermostatic valve assembly of claim 1, wherein the drive pin is received within the drive opening with a clearance fit that permits rotational movement of the ball valve component relative to the plunger.

8. The thermostatic valve assembly of claim 1, wherein the flat section of the first portion is configured to engage the drive pin to transmit rotational movement to the ball valve component during at least a portion of movement of the plunger between the first linear position and the second linear position.

9. A thermostatic assembly for use in a thermostatic valve assembly having a chamber, the thermostatic assembly comprising:
a wax element;
a ball valve component having a drive pin; and
a plunger having a drive opening that is configured to receive the drive pin,
wherein the drive opening defines a partially flattened oval profile with a first portion that defines a flat section with a curved turn at each end and a second portion that defines a curve that is connected at each of its ends to the first portion,
wherein the plunger is connected to the wax element and slideably secured within the chamber and configured to move between a first linear position and a second linear position, and
wherein the ball valve component is rotatably secured within the chamber and configured to move between a first rotational position when the plunger is in the first linear position and a second rotational position when the plunger is in the second linear position.

10. The thermostatic valve assembly of claim 9, wherein the curve of the second portion is a half-oval.

11. The thermostatic valve assembly of claim 9, wherein the curve of the second portion is a half-circle.

12. The thermostatic valve assembly of claim 9, wherein the partially flattened oval profile is symmetrical across an axis substantially parallel to the plunger.

13. The thermostatic valve assembly of claim 12, wherein the plunger is configured to move between a first linear position and a second linear position in a direction that is parallel to the vertical axis.

14. The thermostatic valve assembly of claim 9, wherein the drive pin has a circular cross-section.

15. The plunger of claim 9, wherein the drive pin has a circular cross-section.

16. A plunger for use in a thermostatic assembly having a wax element and a ball valve component having a drive pin, the plunger comprising:
a neck portion; and
a body portion that defines a drive opening configured to receive the drive pin,
wherein the drive opening defines a partially flattened oval profile with a first portion that defines a flat section with a curved turn at each end and a second portion that defines a curve that is connected at each of its ends to the first portion,
wherein the plunger is connected to the wax element and slideably secured and configured to move between a first linear position and a second linear position, and
wherein the plunger is configured to move the ball valve component between a first rotational position when the plunger is in the first linear position and a second rotational position when the plunger is in the second linear position.

17. The plunger of claim 16, wherein the curve of the second portion is a half-oval.

18. The plunger of claim 16, wherein the curve of the second portion is a half-circle.

19. The plunger of claim 16, wherein the partially flattened oval profile is symmetrical across an axis substantially parallel to the plunger.

20. The plunger of claim 19, wherein the plunger is configured to move between a first linear position and a second linear position in a direction that is parallel to the vertical axis.

\* \* \* \* \*